(12) United States Patent
Cheng et al.

(10) Patent No.: US 9,415,512 B2
(45) Date of Patent: Aug. 16, 2016

(54) SYSTEM AND METHOD FOR ENHANCING A VISUALIZATION OF COORDINATE POINTS WITHIN A ROBOTS WORKING ENVELOPE

(71) Applicant: Fanuc America Corporation, Rochester Hills, MI (US)

(72) Inventors: Sai-Kai Cheng, Rochester Hills, MI (US); Gordon Geheb, Hartland, MI (US); Nivedhitha Giri, Auburn Hills, MI (US); Randy A. Graca, Macomb, MI (US); David J. O'Toole, Fenton, MI (US)

(73) Assignee: Fanuc America Corporation, Rochester Hills, MI (US)

( * ) Notice: Subject to any disclaimer, the term of this patent is extended or adjusted under 35 U.S.C. 154(b) by 0 days.

(21) Appl. No.: 14/471,016

(22) Filed: Aug. 28, 2014

(65) Prior Publication Data

US 2016/0059414 A1     Mar. 3, 2016

(51) Int. Cl.
*G06F 19/00* (2011.01)
*B25J 9/16* (2006.01)

(52) U.S. Cl.
CPC ................................ *B25J 9/1664* (2013.01)

(58) Field of Classification Search
CPC ...... B25J 9/1664; B25J 9/1656; B25J 9/1661; B25J 9/1669; B25J 11/005; B25J 13/06; B25J 13/00; B25J 9/16
USPC .................. 700/245, 248, 249, 253, 257, 264
See application file for complete search history.

(56) References Cited

U.S. PATENT DOCUMENTS

| | | | | |
|---|---|---|---|---|
| 5,906,761 A | * | 5/1999 | Gilliland | B25J 9/1671 219/124.33 |
| 6,167,328 A | * | 12/2000 | Takaoka | B25J 9/1671 318/568.1 |
| 6,282,460 B2 | * | 8/2001 | Gilliland | G05B 19/04 29/705 |
| 6,292,715 B1 | * | 9/2001 | Rongo | B25J 9/1664 318/568.1 |
| 6,560,513 B2 | | 5/2003 | Krause | |
| 6,804,580 B1 | * | 10/2004 | Stoddard | B25J 9/1669 318/568.1 |
| 7,164,971 B2 | * | 1/2007 | Ferla | B25J 13/06 700/247 |
| 7,177,724 B2 | * | 2/2007 | Cantello | H01H 9/0214 700/247 |
| 2001/0004718 A1 | * | 6/2001 | Gilliland | B25J 9/1671 700/255 |
| 2010/0305758 A1 | * | 12/2010 | Nishi | B23Q 17/00 700/264 |
| 2014/0156068 A1 | * | 6/2014 | Graca | B25J 9/1666 700/248 |

* cited by examiner

*Primary Examiner* — Jaime Figueroa
(74) *Attorney, Agent, or Firm* — Fraser Clemens Martin & Miller LLC; William J. Clemens (57) ABSTRACT

A system and method for enhancing a visualization of coordinate points within a robot's working envelope is disclosed. Part data associated with a position of a part, which may include part offset from a known position, is read using a teach pendant program. The part data is automatically stored within a hidden program instruction of the teach pendant program. The part data may be stored within the part program in a motion instruction associated with a motion line of the teach pendant program.

16 Claims, 5 Drawing Sheets

SYSTEM AND METHOD FOR ENHANCING A VISUALIZATION OF COORDINATE POINTS WITHIN A ROBOTS WORKING ENVELOPE

FIELD OF THE INVENTION

The present invention relates generally to robotic systems, and more particularly, to systems and methods for part location during operation of robotic systems including moving conveyors.

BACKGROUND OF THE INVENTION

Programmable controllers operate elaborate industrial equipment, such as robots, in accordance with a plurality of stored control programs. When executed, each program causes the programmable controller or robot controller to examine the state of the controlled machinery by evaluating signals from one or more sensing devices (e.g., position encoders, temperature sensors, or pressure sensors) and to operate the machinery (e.g., by controlling the output voltage for servo motors, or energizing/de-energizing discrete components) based on a procedural framework, the sensor signals and, if necessary, more complex processing. As an added complexity, the controlled machinery may further include a moving conveyor system that moves work (e.g. a tool or a part to be serviced by a robot) relative to such robot, requiring additional processing to determine work location relative to the robot to facilitate robotic manipulation of the work.

The programmable controller is generally described as a computer-based control unit that is represented by an aggregate of conventional elements. The control unit also supports one or more user interfaces to facilitate operator input of processing programs, commanded positions, and system parameters. Such user interfaces may include teach pendants that allow a programmer to lead a robot through a desired sequence of events by activating the appropriate pendant button or switch, and may include offline PC simulation devices on which a required sequence of functional and positional steps may be written for simulated execution or for actual test execution in combination with a teach pendant.

When establishing a processing program, it is necessary to establish a physical or geometrical relationship between the robot and work to be serviced by the robot. Users want to understand where in the robot envelope a position can and cannot be reached.

To establish physical or geometrical coordinate points precisely within the robot's working envelope using conventional teach pendant systems, an operator typically manually controls the robot, including a conveyor holding the work, and physically teaches the coordinate points by activating an appropriate pendant button or switch. Essentially, a user must manually move work down a conveyor line and then manually move an associated robot to establish a taught position. Program verification and program touch-up also typically require a user to manually lead or walk a robot through the programmed steps. Programming, program verification and program touch-up are typically performed iteratively and may take significant time.

Undesirably, Cartesian conveyor tracking systems may be difficult to use primarily because robot manipulator joint angle locations can change for a given point on the part. A user may teach a point on the work such that the robot can reach that point. However, if the work is moved using the conveyor, the robot must change its posture/joint angles to touch the same point. Moreover, there is no guarantee that the point on the work can be reached by the robot once the work has been moved. And finally, even if a plurality of positions are taught using a teach pendant in the context of establishing a processing program, the teach pendant itself provides no feedback about the viability and acceptability of a processing program so established. Instead, the processing program must be executed to determine acceptability. If the processing program is determined to be unacceptable, then further iterations of teach pendant programming, verification, and touch-up must occur.

Alternatively, a user may utilize a known offline simulation program to develop a processing program for a robot. During execution of the simulation program, data representative of the simulation may be recorded in external files. The user may then manually review and search the data to determine acceptable physical or geometrical coordinate points within the robot's working envelope. However, such data files may be complex and quite large, so that the process of reviewing and searching the data files may require a level of expertise and may further be time consuming. Moreover, existing simulation programs are not capable of capturing data indicative of position for a robot and associated work and using such data for synchronization of the work and the robot for planning and teaching purposes. Lastly, simulation data must be correlated with actual run-time data from a robotic cell to validate that simulated physical and geometrical points are representative of actual points in the work cell.

It is therefore desirable to develop a system and method for enhancing a visualization of physical or geometrical coordinate points within a robot's working envelope, wherein the system and method overcome the shortcomings of the prior art.

SUMMARY OF THE INVENTION

Concordant and consistent with the present invention, a system and method for enhancing a visualization of coordinate points within a robot's working envelope has surprisingly been discovered.

In one embodiment of the method, part data associated with a position of a part is read using a teach pendant program. The part data may include part offset from a known position. The part data is automatically stored within a part program instruction of the teach pendant program. The part data may be stored within the part program in a motion instruction associated with a motion line of the teach pendant program. Additionally, the part program instruction may be hidden from a user of the teach pendant program.

In another embodiment, a robot data associated with a position of the robot is read using the teach pendant program. The robot data is automatically stored within a robot program instruction of the teach pendant program, and may be synchronized with the part data. The part and robot data may be extracted from the respective part and robot program instructions by a one of a programmable controller, a teach pendant controller, and an offline simulation having access to the teach pendant program to provide a graphical representation of the position of the part on a display associated with the robot. The part program instruction and the robot program instruction may be executed by a programmable controller to place one of the part and the robot at a location indicated by the part data and the robot data. A user of the teach pendant program may place one of the part and the robot at a desired location by reference to the graphical representation on the display.

In another embodiment, a programmable controller having a robot is disclosed. The programmable controller includes a teach pendant operating pursuant to a teach pendant program. A processor is coupled to the teach pendant for accepting data associated with at least one of a part position of a part and a robot position of the robot. The processor automatically stores the data within a program instruction within the teach pendant program. The data may include a part offset relative to a known position. Additionally, the program instruction may be hidden from a user. The programmable controller may further include a display device, wherein the programmable controller accesses the program instruction, extracts the data from the program instruction, and provides a graphical representation of the data on the display device.

BRIEF DESCRIPTION OF THE DRAWINGS

The above, as well as other advantages of the present invention will become readily apparent to those skilled in the art from the following detailed description, particularly when considered in the light of the drawings described herein.

DETAILED DESCRIPTION

The following detailed description and appended drawings describe and illustrate various embodiments of the invention. The description and drawings serve to enable one skilled in the art to make and use the invention, and are not intended to limit the scope of the invention in any manner.

Figure 1A:
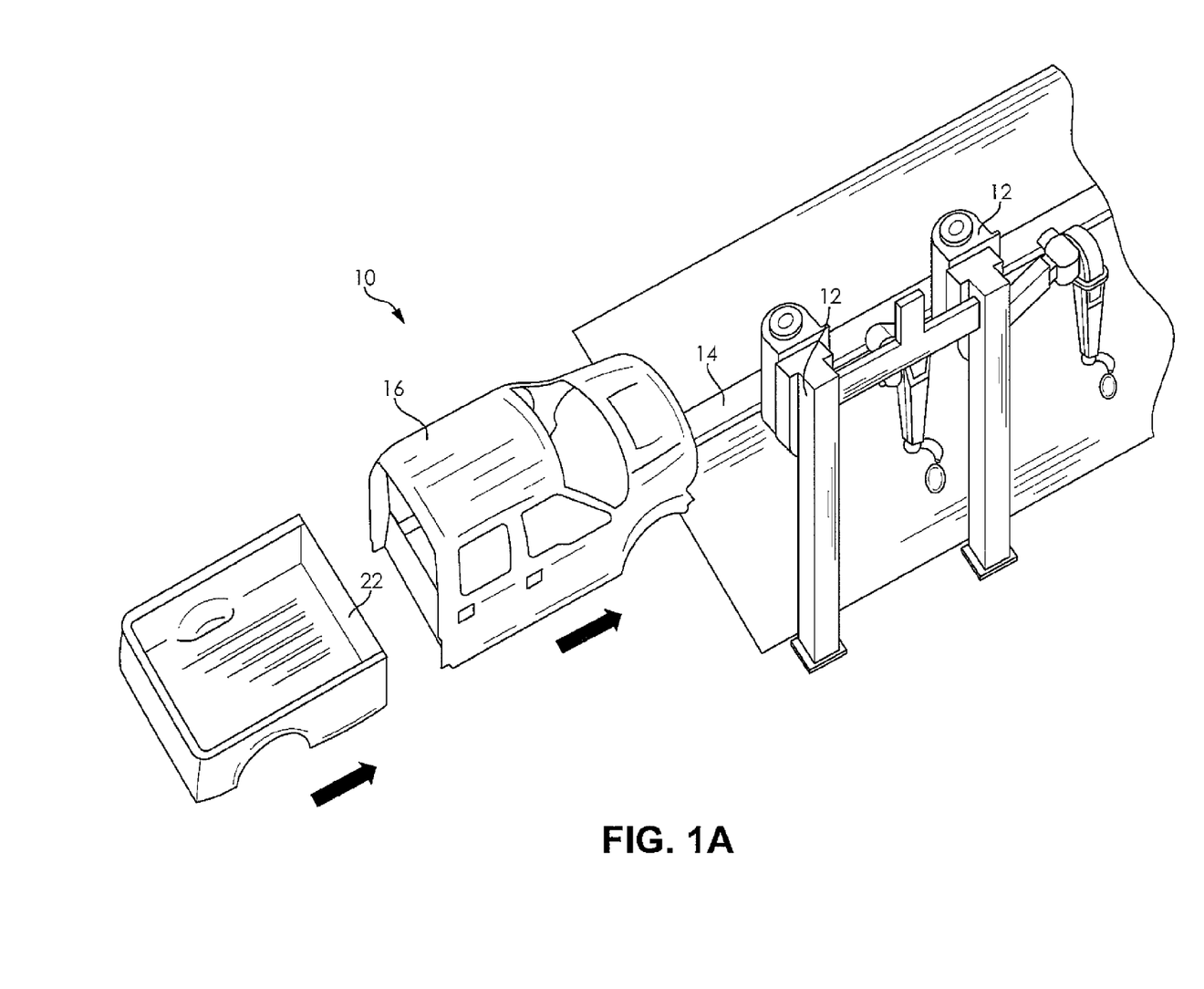
FIGS. 1A and 1B are perspective elevational views illustrating the problems addressed by the present invention.
Figure 1B:
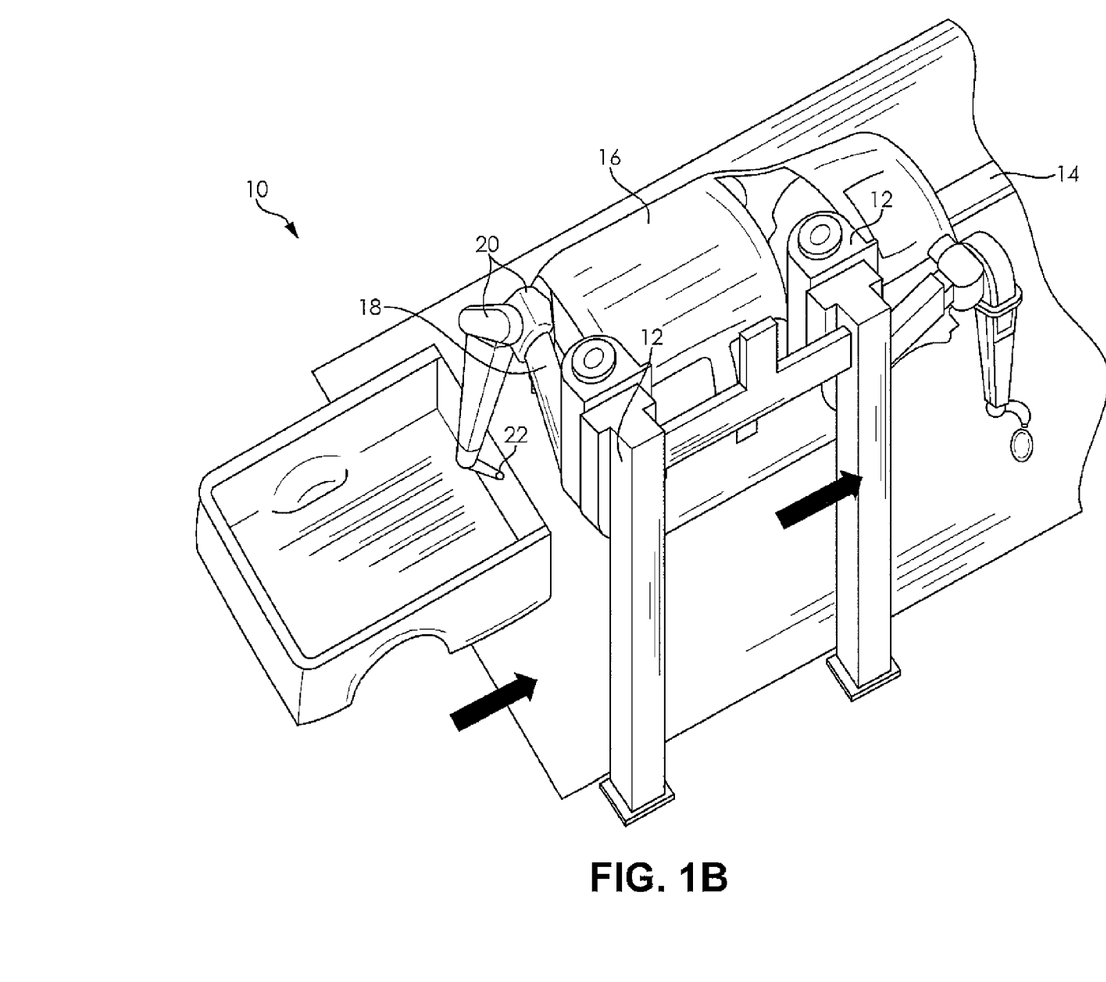

A representative work cell 10 including a robot 12 and a moving conveyor system 14 moving an item of work 16 relative to the robot 12 is described with reference to FIGS. 1A and 1B. The item of work 16 may be a part, a tool, a fixture, or any other item intended to be serviced by the robot 12. It is understood that the moving conveyor system 14 may move the item of work 16 in any dimension and direction, including rotationally, as required to allow the robot 12 to service the item of work 16. The robot 12 may include one or more articulating arms 18, each of which may include one or more joints 20 that provide pivotal, rotational or other movement relative to the item of work 16. As shown in FIG. 1A, the work cell 10 may include more than one robot 12, as required, and may further include one or more sensors (not shown) to detect the position and orientation of the item of work 16.

The work cell 10 may be designed for the robot 12 to specifically service a known point 22 on the item of work 16. It is understood that the robot 12 is interconnected to a programmable controller (not shown), and may further be connected to a teach pendant (not shown) useful for allowing a programmer to lead the robot 12 through a desired sequence of events relative to the item of work 16. Such a programmable controller including a teach pendant may take the form as disclosed in commonly owned U.S. Pat. No. 6,560,513, the disclosure of which is incorporated by reference herein in its entirety.

As noted previously, prior to full operation of a work cell 10, the programmable controller must be properly programmed by a user to operate the robot 12 based on a desired procedural framework. One method of properly programming operation of the robot 12 requires a user, using the teach pendant, to "teach" the known point 22 on the item of work 16 to the programmable controller such that the robot 12 can reach the known point 22, as illustrated in FIG. 1B. If the item of work 16 is moved along the moving conveyor 14, the articulating arms 18 and the joints 20 of the robot 12 may change posture, angles or may otherwise require movement in order to reach the known point 22. As illustrated in FIG. 1A, locations exist along the moving conveyor 14 where it is not possible for the robot 12 to reach the known point 22. In some instances, only slight movement of the item of work 16 along the moving conveyor 14 may result in a positioning of the known point 22 where the robot 12 cannot reach the known point.

During programming processes, a user may manually manipulate the robot 12, the moving conveyor 14 and the item of work 16 to identify one or more positions of the known point 22 along the moving conveyor 14 where the robot may service the known point 22. However, a determination of whether the program is acceptable may only be obtained by running the program. As a non-limiting example, if the previously identified position of the known point 22 causes interference between one or more of the robots 12, then the user will be required to iteratively identify additional positions of the known point 22, which may take significant time. Additionally, during the programming process, the ability to identify a position at which the robot 12 may service the known point 22 provides no indication of the validity, operability and/or viability of the program being created.

Figure 2:
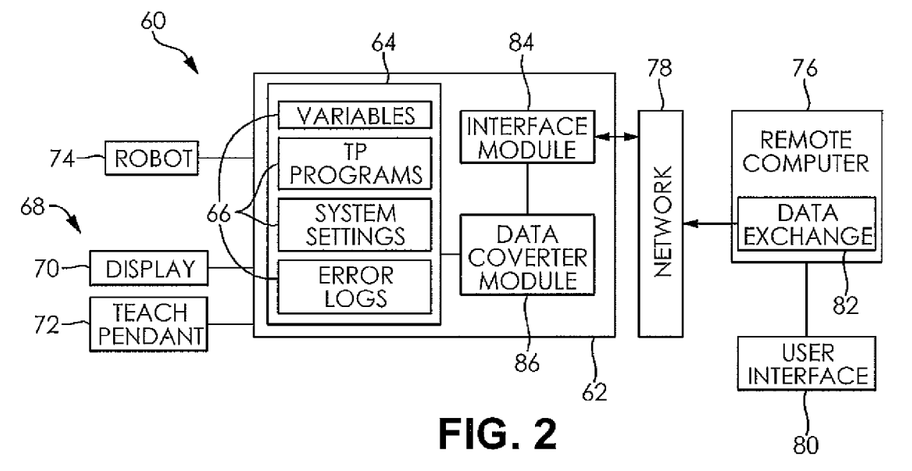
FIG. 2 is a schematic view of a system incorporating the present invention.

FIG. 2 shows a system 60 incorporating the present invention. The system 60 includes at least one programmable controller 62 having a memory 64 for storing a plurality of types of data objects 66. The memory 64 may be any suitable memory type or combination thereof. The types of data objects 66 include, but are not limited to, user program variables, user TP programs, error logs, system settings, configuration and current states, and system variables. These types of data objects 66 are written in different formats as well as by different programming languages. For example, the format may be different for the error logs, the system variables and the user TP programs.

The programmable controller 62 may include a user interface 68 for allowing a user to enter data or programs into the controller 62 or for accessing the data stored therein. The user interface 68 may include a display 70 for displaying the information to the user and a teach pendant 72.

The programmable controller 62 may be a robot controller, wherein in such a case, the controller 62 is coupled to a robot 74 for actively performing a variety of tasks. It is understood that the robot 74 may include a movable conveyor (not shown) for moving an item of work (not shown). It is further understood that the present invention is not limited to robot controllers. As a non-limiting example, the programmable controller 62 may be a passive controller, such as a monitoring device that monitors predetermined conditions.

To assist in monitoring operation of the programmable controller 62, at least one remote computer 76 is coupled to the programmable controller 62 preferably via a functional network 78. The remote computer 76 may be located in the same room or building as the programmable controller 62, or it may be located in an entirely different building, which may or may not be located in the same geographic vicinity as the controller 62. The network 78 may be a local or wide area network of controllers or may be a direct link between devices.

Coupled to the remote computer 76 is one or more second user interfaces 80, which may include a remote computer device such as a simulation computer for entering information regarding the desired data to be accessed. The remote computer 76 also includes a data exchange facilitator 82, in communication with the user interface 80 and the network 78, for facilitating data interchange with the programmable controller 62.

The programmable controller 62 may include an interface module 84 coupled to the network 78 for receiving requests for data from the remote computer 76. The interface module 84 may be coupled to a data converter module 86, which is in communication with memory 64, for processing the request and converting data into a comprehensible format that is readable by the user of the remote computer 76, such as, text, graphics, audio, or tabular format.

Figure 3:
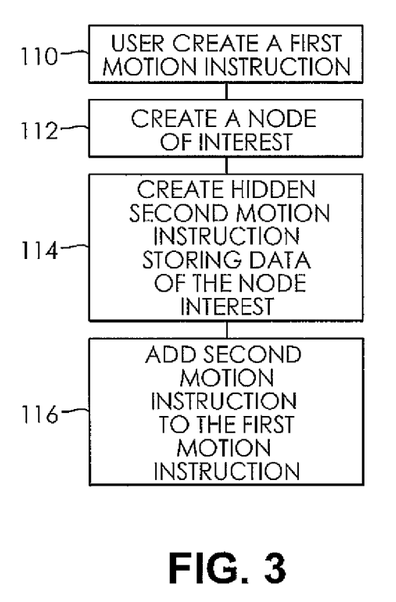
FIG. 3 is a schematic flow diagram of a method for data collection of nodes of interest within a robot's working envelope, according to an embodiment of the invention.

FIG. 3 is a flow diagram illustrating general steps associated with a programming operation in one embodiment of the invention. At a first process block 110, a user of a teach pendant 72 creates a part motion instruction for the robot 74. The part motion instruction may be stored as a data object 66 within the memory 64, for example. In one embodiment, the part motion instruction is stored as a motion instruction within the teach pendant program, and may require motion of the robot 74, including an associated moving conveyor, to move both the robot 74 and an item of work to a desired location. In process block 112, a node of interest is created as a data object 66 that is defined by the desired location of one or both of the robot and the moving conveyor in response to the part motion instruction created by the user. In one embodiment, termination of movement by one or both of the robot and the moving conveyor in response to the part motion instruction may be used to define one or more nodes of interest associated with the part motion instruction. As non-limiting examples, the node of interest may be defined using Cartesian coordinates, vectors, distance from a known point, or the like. In one embodiment, the node of interest is defined as an offset value relative to a known point, such as a detect switch.

In process block 114, the programmable controller 62 stores data indicative of the node of interest created in process block 112 in a hidden robot motion instruction. In process block 116, the hidden robot motion instruction is stored as a data object 66 within the memory 64, for example. In one embodiment, the hidden robot motion instruction is stored as a motion instruction within the teach pendant program. The hidden robot motion instruction may be added to the part motion instruction, or it may be added discretely adjacent to or associated with the part motion instruction. It is understood that the user may repeatedly create nodes of interest using process steps 110, 112, 114 and 116. In this manner, data indicative of each node of interest may be added to the memory as data objects, or to the teach pendant program as hidden motion instructions. The data indicative of each node of interest is not directly utilized by the user, but may be accessed by any routine, task, interface module or the like interconnected with the programmable controller 62.

Figure 4:
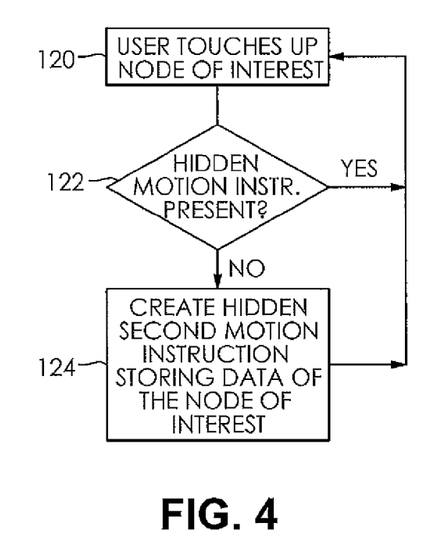
FIG. 4 is a schematic flow diagram of a method for data collection of nodes of interest within a robot's working envelope, according to an embodiment of the invention.

According to the embodiment of FIG. 3, a hidden robot motion instruction is created any time the user creates a new part motion instruction in the teach pendant program. As shown in FIG. 4, the present invention may also be used to add nodes of interest to existing programs during program editing and validation, or may be used in tracking routines to verify locations of nodes of interest. In step 120 of FIG. 4, a user may touch up a node of interest. In operation, the user may manipulate the robot 74, the moving conveyor, or both, using the teach pendant 72, a remote computer 76, or any other method used to manipulate the robot 74.

At step 122 of FIG. 4, after the user touches up a node of interest, the data objects 66, or the teach pendant program lines, as applicable, are queried to determine whether a hidden robot instruction exists that contains information indicative of the node of interest being touched. If no such hidden robot instruction exists, the present invention automatically creates the hidden robot instruction storing data indicative of the node of interest being touched in step 124. The hidden robot motion instruction created thereby may be stored as a data object 66 within the memory 64, for example. In one embodiment, the hidden robot motion instruction is stored as a motion instruction within the teach pendant program. Once step 122 detects the presence of a hidden robot instruction, or after the hidden robot instruction is created in step 124, the system resets until the user touches up another node of interest in step 120. In this manner, additional nodes of interest may be added at any time, even after the programmable controller 62 has been fully programmed by the user.

Figure 5:
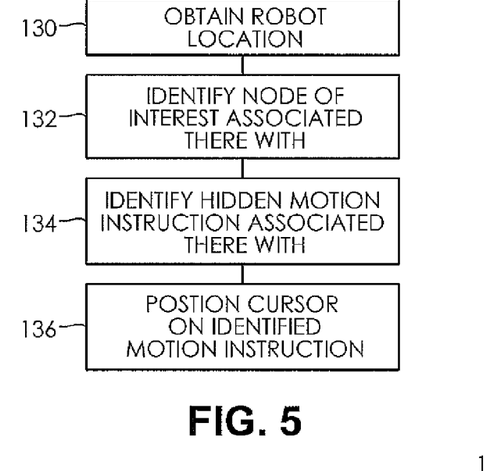
FIG. 5 is a schematic flow diagram of a simulation method using the collected nodes of interest, according to an embodiment of the invention.

According to an embodiment of the invention, all data indicative of nodes of interest captured and stored within hidden robot motion instructions associated with each node of interest may be stored in the memory 64 and may be accessed by any routine, task, interface module or the like interconnected with the programmable controller 62, which may further process the data. As a result, the data may be used to review the programs and to manipulate the robot 74. For example, as shown in FIG. 5, in process step 130, a user may obtain a robot position, either by moving the robot 74 to an actual position or through simulated movement of the robot. In process step 132, the present invention is able to identify one or more nodes of interest associated with the robot position obtained in step 130 that is included within the programmable controller program. In addition to identifying one or more nodes of interest, the present invention may also identify any hidden motion instructions included within the programmable controller program associated with the one or more nodes of interest, at process step 134. At process step 136, the present invention may highlight the specific motion instructions included within the programmable controller program associated with the robot position, quickly allowing the user or a programmer to review the specific motion instructions associated with a robot position within the programmable controller program. In this way, the program associated with movements of the robot may be quickly reviewed for errors or for potential interference with other manufacturing operations, including with other robots.

Figure 6:
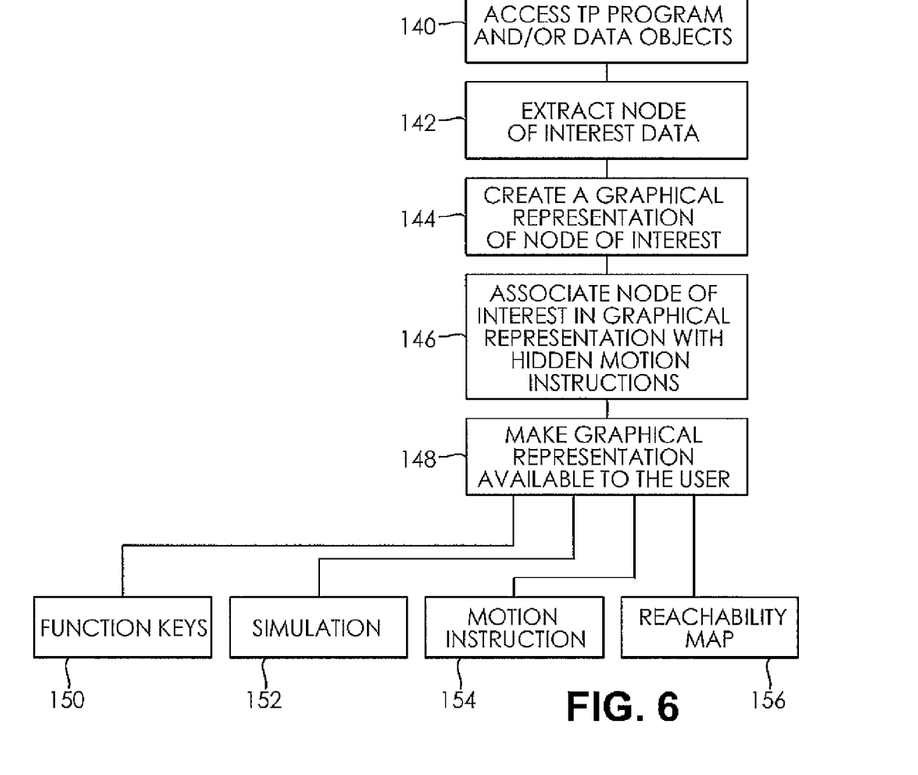
FIG. 6 is a schematic flow diagram of a display method using the collected nodes of interest, according to an embodiment of the invention.

A flow diagram according to an embodiment of the invention wherein the data indicative of nodes of interest that is captured and stored within hidden robot motion instructions associated with each node of interest may also be used to directly manipulate the robot is shown in FIG. 6. In process step 140, the data indicative of nodes of interest may be accessed by any routine, task, interface module or the like interconnected with the programmable controller 62, which may further process the data. For example, if the data is stored in hidden robot motion instruction lines in the teach pendant program, any routine, task, interface module or the like may access the teach pendant program. At process step 142, the stored data is extracted from the storage location. In process step 144, the stored data is further processed to create a graphical representation of the nodes of interest. In one embodiment, the graphical representation may be displayed on the display 70 associated with the teach pendant 72. In another embodiment, the graphical representation may be displayed on the user interface 80 of the remote computer 76. The graphical representation may be in any format, and may show some or all of the nodes of interest and the stored data. In process step 146, the nodes of interest shown on the graphical representation are associated with the hidden robot motion instructions containing the data indicative of the respective nodes of interest. Thereafter, in process step 148, the graphical representation is made available to the user, who may utilize the graphical representation in any desirable manner. As a non-limiting example, as shown in step 150, the graphical representation may include function keys associated with particular nodes of interest. The function keys may be contained inside or outside of the graphical representation, and may further be included on the teach pendant. Actuation of the function key may cause the programmable controller to advance the robot and/or the movable conveyor to a desired node of interest, either in a simulation run or on the robot itself. As noted above, with reference to process step 134 of FIG. 5, selection of a function key associated with a node of interest may also highlight a particular motion instruction associated with the chosen node of interest. As a further non-limiting example, within a simulation environment or a testing environment and indicated in process step 152, a user may be able to point to a node of interest within the graphical representation, e.g. using a mouse click, which will cause the simulation or the actual robot, including any moving conveyor, to read the hidden motion instruction to snap the system, including the robot and the item of work, to the chosen node of interest. As a further non-limiting example indicated in process step 154, a user may be able to point to a node of interest within the graphical representation to execute the hidden move instruction for that node of interest to snap the system to the chosen node of interest. As still a further non-limiting example, shown in process step 156 and further depicted in FIGS. 7A and 7B, all data indicative of all nodes of interest captured and stored within hidden robot motion instructions associated with each node of interest may be further processed to create a graphical reachability map 200 of a robotic work cell 210.

Figure 7A:
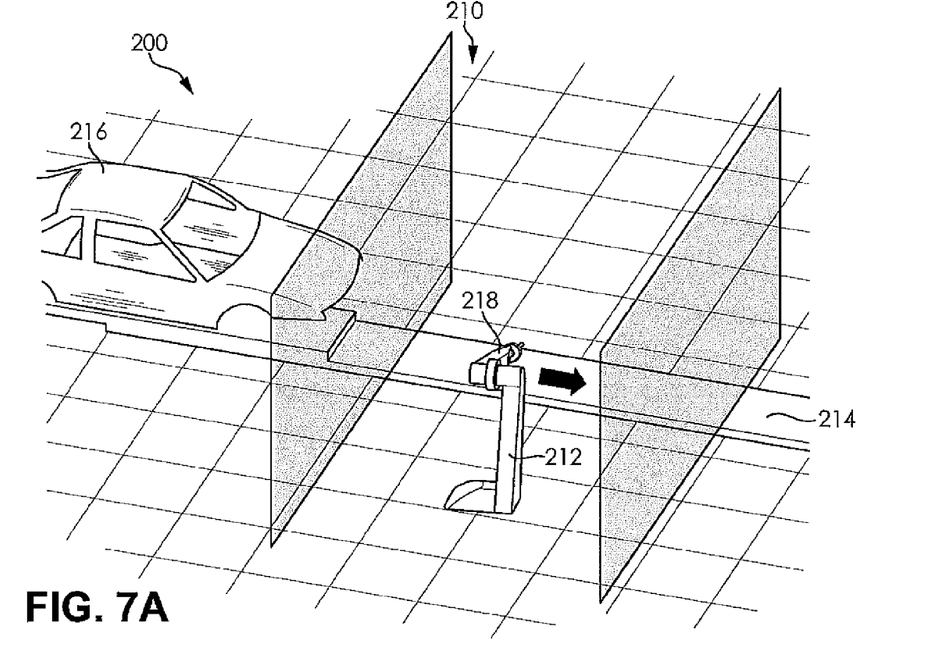
FIGS. 7A and 7B are perspective elevational views of a display method using the collected nodes of interest, according to an embodiment of the invention
Figure 7B:
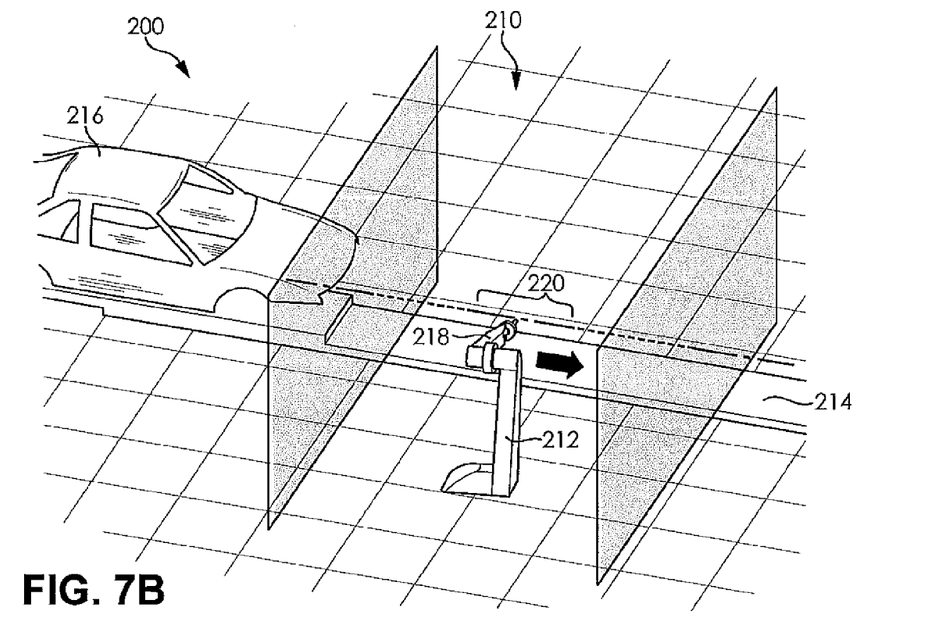

The reachability map 200 may graphically depict all or part of a work cell 210 including a robot 212 and a moving conveyor system 214 moving an item of work 216 relative to the robot 212. The item of work 216 may be shown as a part, a tool, a fixture, or any other item intended to be serviced by the robot 212. One or more articulating arms 218 may be shown, as required. Within the robotic work cell 210, accessible areas may be indicated graphically, as shown at reference number 220 on the reachability map 200 in FIG. 7B. Similarly, non-accessible areas may be graphically depicted, as indicated at reference number 222 on the reachability map 200 in FIG. 7B. It is understood that accessible areas 220 and non-accessible areas 222 may be graphically depicted in any desirable manner, without limitation. As a non-limiting example, accessible areas 220 may be depicted in one color, e.g. green, while non-accessible areas 222 may be depicted in another color, e.g. red, on the reachability map 200. In this way, a relatively non-skilled user of the programmable controller may clearly, quickly and easily place a part in the robotic work cell 210 in a desired position. Any additional touch-up or part manipulation by the robot 212 may be easily and quickly visualized and accomplished. A user is able to quickly and easily see where a node of interest is reachable by the system without having to manually move the robot and the item of work to that position. Using the reachability map 200, the specific move instructions may be reviewed, modified, or tested, and additional move instructions may be easily generated to enhance the productivity of the work cell. And finally, troubleshooting difficulty is minimized because a user may quickly and easily snap the system to a particular node of interest within a simulation, within the actual load cell, or within both. Program review, playback, validation and troubleshooting is simplified because data indicative of nodes of interest is readily available, either as a data object or as a hidden instruction contained within the machine program. Lastly, simulation calibration, tolerance and accuracy may be easily enhanced without troublesome and time consuming manual movement of the robot or the item of interest.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for enhancing a visualization of coordinate points within a robot's working envelope, comprising:
reading a part data associated with a position of at least one of a part and a robot using a teach pendant program;
automatically storing the part data within a part program instruction of the teach pendant program;
reading a robot data associated with a position of the robot using the teach pendant program;
automatically storing the robot data within a robot program instruction of the teach pendant program;
synchronizing the part data and the robot data;
accessing the part program instruction and the robot program instruction;
extracting the part data and the robot data from the part program instruction and the robot program instruction, respectively; and
providing a graphical representation of the position of the part on a display associated with the robot.

2. The method of claim 1, wherein the part program instruction is a motion instruction associated with a motion line within the teach pendant program.

3. The method of claim 1, wherein the part program instruction is hidden from a user.

4. The method of claim 1, wherein the part data includes part offset relative to a known position.

5. The method of claim 1, wherein the part program instruction is accessible by at least one of a programmable controller, a teach pendant controller, and an offline simulation.

6. The method of claim 1, wherein the part program instruction and the robot program instruction may be executed by a programmable controller to place one of the part and the robot at a location indicated by the part data and the robot data.

7. The method of claim 1, wherein a user may place one of the part and the robot at a location by reference to the graphical representation on the display.

8. A method for enhancing a visualization of coordinate points within a robot's working envelope, comprising:
creating a part motion instruction for the robot in a control program;
creating a node of interest defined by a desired location of at least one of the robot, an item of work and a moving conveyor;
obtaining and storing data indicative of the node of interest in the part motion instruction; and processing the data to create a graphical representation of the node of interest.

9. The method of claim 8, wherein the control program is a teach pendant program.

10. The method of claim 8, wherein the node of interest is defined as an offset value relative to a known point.

11. The method of claim 8, further comprising the step of:
enabling execution of the robot motion instruction via user interaction with the graphical representation.

12. The method of claim 8, further comprising the steps of:
processing the data to create a reachability map of the node of interest within a graphical representation of the robot's working envelope;
enabling execution of the robot motion instruction via user interaction with the reachability map.

13. A programmable controller having a robot, comprising:
a teach pendant operating pursuant to a teach pendant program;
a processor coupled to the teach pendant for accepting data associated with at least one of a part position of a part and a robot position of the robot;
wherein the processor automatically stores the data within a program instruction within the teach pendant program; and
a display device, wherein the programmable controller accesses the program instruction, extracts the data from the program instruction, and provides a graphical representation of the data on the display device.

14. The programmable controller of claim 13, wherein the data includes part offset relative to a known position.

15. The programmable controller of claim 14, wherein the program instruction is hidden from a user.

16. The programmable controller of claim 15, wherein the program instruction is a motion instruction associated with a motion line within the teach pendant program.

* * * * *